United States Patent [19]
Goode et al.

[11] Patent Number: 5,137,994
[45] Date of Patent: Aug. 11, 1992

[54] PROCESS FOR THE SIMULTANEOUS TRIMERIZATION AND COPOLYMERIZATION OF ETHYLENE

[75] Inventors: Mark G. Goode, St. Albans; Thomas E. Spriggs, Crosslanes, both of W. Va.; Isaac J. Levine, Belle Mead, N.J.; Wayne R. Wilder, Dunbar; Calvin L. Edwards, Hurricane, both of W. Va.

[73] Assignee: Union Carbide Chemicals & Plastics Technology Corporation, Danbury, Conn.

[21] Appl. No.: 704,353

[22] Filed: May 23, 1991

[51] Int. Cl.$^5$ ............................. C08F 2/34; C08F 4/52
[52] U.S. Cl. ...................... 526/75; 526/127; 526/348.5; 526/901; 526/905
[58] Field of Search ............... 526/127, 905, 348.5, 526/75, 129, 901

[56] References Cited

U.S. PATENT DOCUMENTS

| | | | |
|---|---|---|---|
| 3,324,095 | 6/1967 | Carrick et al. | 260/88.2 |
| 3,324,101 | 6/1967 | Baker et al. | 260/94.9 |
| 3,704,287 | 11/1972 | Johnson | 260/94.9 |
| 5,071,927 | 12/1991 | Benham et al. | 526/75 |

Primary Examiner—Fred Teskin
Attorney, Agent, or Firm—Saul R. Bresch

[57] ABSTRACT

A process for the simultaneous trimerization of ethylene and the copolymerization of the trimer with ethylene comprising continuously contacting ethylene, the 1-hexene which is formed, and, optionally, hydrogen in a reaction zone, under trimerization and polymerization conditions, with the supported reaction product of one or more bis-triarylsilyl chromates and one or more trihydrocarbylaluminum compounds wherein the atomic ratio of aluminum to chromium is at least about 3 to 1.

14 Claims, No Drawings

PROCESS FOR THE SIMULTANEOUS TRIMERIZATION AND COPOLYMERIZATION OF ETHYLENE

TECHNICAL FIELD

This invention relates to the trimerization of ethylene and the copolymerization of the trimer and ethylene, all in the same reactor.

BACKGROUND INFORMATION

The copolymerization of ethylene and 1-hexene in the presence of a catalyst system comprised of the reaction product of a bis-hydrocarbylsilyl chromate and a trihydrocarbylaluminum compound has been disclosed. The latter compound is, on occasion, identified as a cocatalyst and, at other times, as a promoter or reducing agent when it is reacted with the chromate prior to carrying out the copolymerization. See, for example, U.S. Pat. Nos. 3,324,095; 3,324,101 and 3,704,287.

In some remote locations where 1-hexene is unavailable, there is a need for a simple process for making 1-hexene for use as a comonomer in quantities which are usually not sufficient to justify the expense of a separate plant for the trimerization of ethylene. Without such a process, copolymerization with the catalyst system described above is simply not economic.

An example of a trimerization process, which requires its own plant is the process described in U.S. Pat. No. 4,668,838, while an example of in situ dimerization/copolymerization can be found in U.S. Pat. No. 4,861,846. The latter patent describes a process, which provides comonomer in situ. Unfortunately, the comonomer is 1-butene. Further, the process utilizes both a polymerization catalyst and a dimerization catalyst.

It would be advantageous to provide an in situ trimerization/copolymerization process where the trimer is 1-hexene and only one catalyst is necessary for both the trimerization and copolymerization.

DISCLOSURE OF THE INVENTION

An object of this invention, therefore, is to provide a process for the trimerization and copolymerization of ethylene, which generates 1-hexene in situ, utilizes a single catalyst for both trimerization and polymerization, and substantially reduces or eliminates the costs attributed to providing 1-hexene.

Other objects and advantages will become apparent hereinafter.

According to the present invention, a process has been discovered for the simultaneous trimerization of ethylene and the copolymerization of the trimer with ethylene comprising continuously contacting ethylene, the 1-hexene which is formed, and, optionally, hydrogen in a reaction zone, under trimerization and polymerization conditions, with the supported reaction product of one or more bis-triarylsilyl chromates and one or more trihydrocarbylaluminum compounds wherein the atomic ratio of aluminum to chromium is at least about 3 to 1.

DETAILED DESCRIPTION

The bis-triarylsilyl chromates and a method for their preparation are described in the patents mentioned above. Examples of these compounds are bis-triphenylsilyl chromate; bis-tritolylsilyl chromate; bis-trixylylsilyl chromate; bis-trinaphthylsilyl chromate; bis-triethylphenylsilyl chromate; and bis-trimethylnaphthylsilyl chromate.

The trihydrocarbylaluminum compounds can be represented by the formula $R_3Al$ wherein each R is an alkyl, cycloalkyl, aryl, or hydride radical; at least one R is a hydrocarbyl radical; two or three R radicals can be joined in a cyclic radical forming a heterocyclic structure; each R can be the same or different; and each R, which is a hydrocarbyl radical, has 1 to 20 carbon atoms, and preferably 1 to 10 carbon atoms. Further, each alkyl radical can be straight or branched chain and such hydrocarbyl radical can be a mixed radical, i.e., the radical can contain alkyl, aryl, and/or cycloalkyl groups. Examples of suitable radicals are: methyl, ethyl, propyl, isopropyl, butyl, isobutyl, tert-butyl, pentyl, neopentyl, hexyl, 2-methylpentyl, heptyl, octyl, isooctyl, 2-ethylhexyl, 5,5-dimethylhexyl, nonyl, decyl, isodecyl, undecyl, dodecyl, phenyl, phenethyl, methoxyphenyl, benzyl, tolyl, xylyl, naphthyl, naphthal, methylnaphthyl, cyclohexyl, cycloheptyl, and cyclooctyl.

Examples of suitable hydrocarbyl aluminum compounds are as follows: triisobutylaluminum (TIBA), trihexylaluminum, di-isobutylaluminum hydride, dihexylaluminum hydride, isobutylaluminum dihydride, hexylaluminum dihydride, di-isobutylhexylaluminum, isobutyl dihexylaluminum, trimethylaluminum, triethylaluminum, trip ropylaluminum, triisopropylaluminum, tri-n-butylaluminum, trioctylaluminum, tridecylaluminum, tridodecylaluminum, tribenzylaluminum, triphenylaluminum, trinaphthylaluminum, and tritolylaluminum. The preferred hydrocarbyl aluminums are triethylaluminum, triisobutylaluminum, trihexylaluminum, di-isobutylaluminum hydride, and dihexylaluminum hydride.

As noted above, the reaction product of the chromate and the trihydrocarbylaluminum compound is supported. While silica is the preferred support, other inorganic oxides can be used. Examples of useful support materials are aluminum phosphate, alumina, silica/alumina mixtures, silica modified with an organoaluminum compound such as triethylaluminum, silica modified with diethylzinc, and a mixture of silica and calcium carbonate. A typical support is a dehydrated, solid, particulate porous material essentially inert to the polymerization. It is used as a dry powder having an average particle size of about 10 to about 250 microns and preferably about 30 to about 100 microns; a surface area of at least about 3 square meters per gram and preferably at least about 50 square meters per gram; and a pore size of at least about 80 Angstroms and preferably at least about 100 Angstroms.

The catalyst can be prepared by reacting the bis-triarylsilyl chromate, the trihydrocarbylaluminum compound, and a dehydrated support material together. The bis-triarylsilyl chromate reacts with hydroxyl groups, which are present on the surface of the support. The reaction follows:

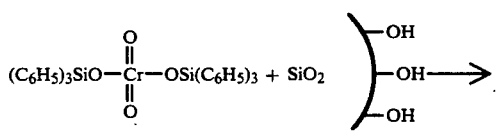

-continued

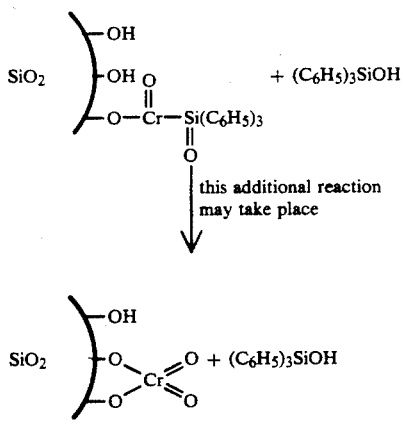

this additional reaction may take place

Thus, the chromate is chemically adsorbed on the surface of the support. Any part of the chromate, which is not chemically adsorbed, is physically adsorbed on the surface of the support. Usually, about 50 percent to about 100 percent of the chromate is chemically adsorbed. It should be noted, however, that the chromate retains one or more reactive groups, which react with the trihydrocarbylaluminum compound.

A typical procedure for preparing the catalyst is as follows:

A mix tank is cleaned with isopentane, and charged with 1,000 grams of silica, which has been first dehydrated at 600° C. The mix tank is charged with 5,000 grams of isopentane, and agitation is initiated. The tank is then charged with 30.52 grams of triphenylsilyl chromate. The pressure of the mix tank is increased to 1,550 millimeters of mercury and the temperature to 45° C. The mixture is agitated for 10 hours. The tank is then cooled, and 286 grams of a solution of 20 percent by weight triisobutylaluminum (TIBA) in isopentane is added. The tank is reheated to 45° C. and is agitated for 2 hours. The pressure is then reduced to 1,050 millimeters of mercury in 50 millimeter of mercury increments every 15 minutes. The temperature then rises to 70° C. and a 400 cubic centimeter per minute nitrogen purge is started to dry the mixture. The temperature is maintained at 70° C. and the pressure at 1,080 millimeters of mercury. The drying is continued for about 10 hours.

Approximately 800 grams of catalyst, i.e., the reaction product of triphenylsilyl chromate and triisobutylaluminum having an aluminum/chromium atomic ratio of 6:1, are recovered.

The amount of each catalyst component is selected to provide an atomic ratio of aluminum to chromium of at least about 3 to 1, preferably in the range of about 6 to 1 to about 15 to 1.

The amount of support used is that which will provide about 0.01 to about 0.1 millimole of chromium per gram of support and preferably about 0.03 to about 0.06 millimole of chromium per gram of support.

The heterogeneous catalyst is such that it does not dissolve in gas phase or liquid phase trimerization or polymerization environments.

The trimerization and copolymerization can be conducted in the gas phase or liquid phase using conventional techniques such as fluidized bed or slurry processes. A continuous fluidized bed process is preferred.

A typical fluidized bed reactor is described in U.S. Pat. No. 4,482,687.

In a typical fluidized bed process, the catalyst and ethylene are continuously fed into the reactor and the ethylene/1-hexene copolymer is continuously removed. The catalyst can be introduced in a weight ratio of catalyst to polymer of about 0.00005:1 to about 0.001:1, preferably about 0.0002:1 to about 0.0006:1.

The bed is usually made up of the same granular resin that is to be produced in the reactor. Thus, during the course of the polymerization, the bed comprises formed polymer particles, growing polymer particles, and catalyst particles fluidized by polymerizable and modifying gaseous components introduced at a flow rate or velocity sufficient to cause the particles to separate and act as a fluid. The fluidizing gas is made up of the initial feed, make-up feed, and cycle (recycle) gas, i.e., monomer and, if desired, modifiers and/or an inert carrier gas.

The essential parts of the reactor are the vessel, the bed, the gas distribution plate, inlet ad outlet piping, a compressor, a cycle gas cooler, and a product discharge system. In the vessel, above the bed, there is a velocity reduction zone, and in the bed, a reaction zone. Both are above the gas distribution plate. The ethylene is preferably introduced into the reactor by means of a syringe continuous feeder.

The fluidized bed, or other gas phase, reactor can be operated at a temperature in the range of about 70° C. to about 120° C. and preferably at a temperature in the range of about 80° C. to about 110° C. The operating pressure can be in the range of about 200 psig to about 400 psig or higher and is preferably about 300 psig to about 350 psig. The partial pressure of the ethylene can be in the range of about 150 to about 350 psi and is preferably about 230 to about 280 psi. It is noted that 1-hexene can be used initially in subject process until sufficient trimerization takes place to support the copolymerization. In this case, the partial pressure of the 1-hexene can be in the range of about 0.6 psi to about 2.5 psi, and is preferably in the range of about 0.9 psi to about 1.8 psi. The superficial gas velocity, which can be calculated by measuring cycle gas flow, is, generally, maintained in the range of about 1 to about 3 feet per second, and preferably in the range of about 2 to about 2.5 feet per second.

The residence time of the polymer in the reactor can be in the range of about 1 to about 5 hours and is preferably about 2 to about 2.5 hours.

Hydrogen or another chain transfer agent can be, and is preferably, used in the process. The molar ratio of hydrogen to ethylene can be in the range of 0 to about 0.3:1 and is preferably in the range of 0 to about 0.1:1. This translates into a hydrogen partial pressure in the range of 0 psi to about 70 psi and preferably no more than about 30 psi. The balance of the operating, pressure utilized in the reactor, i.e., after the partial pressures of ethylene and, if used, hydrogen are considered, can be made up by using an inert gas such as nitrogen.

Hydrogen serves another function in this process in that, by adjusting the hydrogen level, the rate of trimerization (or 1-hexene level) and, hence, the density of the ethylene/1-hexene copolymer can be controlled. The rate of trimerization can also be increased by adding a trihydrocarbylaluminum or an aluminoxane to the reactor. The preparation of aluminoxanes is described in U.S. Pat. No. 4,668,838.

A simple way to control the concentration of 1-hexene is to remove it from the reactor by venting cycle gas to the flare and adding make-up ethylene to the reactor. Commercially speaking, however, venting cycle gas is expensive even if it can be returned to an olefin unit for reprocessing. A better approach is to selectively remove and recover 1-hexene from the cycle gas. Another way to control the level of 1-hexene is by inhibiting the trimerization. This can be done by adding compounds such as 1,3-butadiene to the reactor. On the other hand, trimerization can be increased by inhibiting polymerization, e.g., by adding hydrocarbyl isonitriles, amines, or ethers.

The patents mentioned in this specification are incorporated by reference herein.

The invention is illustrated by the following examples.

EXAMPLE 1

Preparation of the Catalyst

A mix tank is cleaned with isopentane, and charged with 929 grams of silica, which is first dehydrated at 600° C. The mix tank is charged with 4,645 grams of isopentane, and agitation is initiated. The tank is then charged with 28.35 grams of triphenylsilyl chromate. The pressure of the mix tank is increased to 1,550 millimeters of mercury and the temperature to 45° C. The mixture is agitated for 10 hours. The tank is then cooled, and 266 grams of a solution of 20 percent by weight triisobutylaluminum (TIBA) in isopentane is added. The tank is reheated to 45° C. and is agitated for 2 hours. The pressure is then reduced to 1,050 millimeters of mercury in 50 millimeter of mercury increments every 15 minutes. The temperature then rises to 70° C. and a 400 cubic centimeter per minute nitrogen purge is started to dry the mixture. The temperature is maintained at 70° C. and the pressure at 1,080 millimeters of mercury. The drying is continued for about 10 hours.

Approximately 732 grams of catalyst i.e., the reaction product of triphenylsilyl chromate and triisobutylaluminum having an aluminum/chromium atomic ratio of 6:1, are recovered.

Trimerization of Ethylene to 1-Hexene and Copolymerization of Ethylene and 1-Hexene The trimerization and copolymerization are carried out in a fluidized bed reactor as described above and in U.S. Pat. No. 4,482,687.

The catalyst is introduced into the reactor in a weight ratio of catalyst to polyethylene produced of 0.00019:1. There is no hydrogen feed to the reactor. The feed rate of 1-hexene is 0.27 pound per hour and the partial pressure of 1-hexene is 0.92 psi. The polymer density is 0.947 grams per cubic centimeter.

It is found in Example 1 that there is trimerization of ethylene to 1-hexene. The rate of trimerization is not sufficient for the discontinuance of the 1-hexene feed to the reactor while maintaining a polymer density of 0.947 gram per cubic centimeter or below.

The catalyst formulation, polymerization conditions, and resin properties for Example 1 are set forth in the Table.

EXAMPLE 2

Preparation of the Catalyst

The catalyst is the same as that for Example 1.

Trimerization of Ethylene to 1-Hexene and Copolymerization of Ethylene and 1-Hexene The trimerization and copolymerization are carried out in a fluidized bed reactor as in Example 1.

The catalyst is introduced into the reactor in a weight ratio of catalyst to polyethylene produced of 0.0002:1. The feed rate of hydrogen is 0.25 the partial pressure of hydrogen is 21.3 psi. The feed rate of 1-hexene is 0.12 pound per hour and the partial pressure of 1-hexene is 0.84 psi. The polymer density is 0.949 gram per cubic centimeter.

The catalyst formulation, polymerization conditions, and resin properties for Example 2 are set forth in the Table.

EXAMPLES 3 AND 4

Preparation of the Catalyst

A mix tank is cleaned with isopentane, and charged with 833 grams of silica, which is first dehydrated at 600° C. The mix tank is charged with 3,665 grams of isopentane, and agitation is initiated. The tank is then charged with 25.4 grams of triphenylsilyl chromate. The pressure of the mix tank is increased to 1,550 millimeters of mercury and the temperature to 45° C. The mixture is agitated for 10 hours. The tank is then cooled, and 397 grams of a solution of 20 percent by weight triisobutylaluminum (TIBA) in isopentane is added. The tank is reheated to 45° C. and the mixture is agitated for 2 hours. The pressure is then reduced to 1,050 millimeters of mercury in 50 millimeter of mercury increments every 15 minutes. The temperature then rises to 70° C. and a 400 cubic centimeter per minute nitrogen purge is started to dry the mixture. The temperature is maintained at 70° C. and the pressure at 1,080 millimeters of mercury. The drying is continued for about 10 hours.

Approximately 743 grams of catalyst, i.e., the reaction product of triphenylsilyl chromate and triisobutylaluminum having an aluminum/chromium atomic ratio of 10:1, are recovered.

Trimerization of Ethylene to 1-Hexene and Copolymerization of Ethylene and 1-Hexene The trimerization and copolymerization are carried out in a fluidized bed reactor as in Example 1.

The catalyst is introduced into the reactor in a weight ratio of catalyst to polyethylene produced of 0.00061:1.

The feed rate of 1-hexene is initially 0.12 pound per hour and the partial pressure of 1-hexene is initially 0.84 psi. The 1-hexene feed is discontinued after three hours.

It is found that excess trimerization requires the 1-hexene feed to be stopped, and that the 1-hexene level in the reactor more than doubles.

In Example 3, the 1-hexene partial pressure increases to 2.1 psi. The polymer density is 0.944 gram per cubic centimeter. The feed rate of hydrogen in Example 3 is 0.08 pound per hour and the partial pressure of hydrogen is 23.3 psi.

1-butene and 1-octene are also detected in the reactor for Example 3. There are no 1-butene or 1-octene feeds to the reactor. The partial pressure of 1-butene is 1.64 psi and the partial pressure of 1-octene is not quantified.

In Example 4, a vent is used to remove excess 1-hexene from the reactor to increase the polymer density. The 1-hexene partial pressure increases to 1.1 psi. The polymer density is 0.946 gram per cubic centimeter.

The feed rate of hydrogen in Example 4 is 0.11 pound per hour and the partial pressure of hydrogen is 23.5 psi.

1-butene and 1-octene are also detected in the reactor for Example 4. There are no 1-butene or 1-octene feeds to the reactor. The partial pressure of 1-butene is 0.73 psi and, the partial pressure of 1-octene is not quantified.

By carbon-13 nuclear magnetic resonance (NMR) analysis, the resin from Example 4 contains 0.32 weight percent 1-butene and 0.65 weight percent 1-hexene incorporated into the polymer. The level of 1-octene is not measured.

It is found in Examples 3 and 4 that increasing the level of triisobutylaluminum (TIBA) in the catalyst increases the rate of 1-hexene trimerization. It is also found that other alpha-olefins are oligomerized by the catalyst, namely 1-butene and 1-octene. The dominant species is 1-hexene.

The catalyst formulation, polymerization conditions, and resin properties for Examples 3 and 4 are set forth in the Table.

EXAMPLE 5

Preparation of the Catalyst

A mix tank is cleaned with isopentane, and charged with 817 grams of silica, which is first dehydrated at 600° C. The mix tank is charged with 4,085 grams of isopentane, and agitation is initiated. The tank is then charged with 24.9 grams of triphenylsilyl chromate. The pressure of the mix tank is increased to 1,550 millimeters of mercury and the temperature to 45° C. The mixture is agitated for 10 hours. The tank is then cooled, and 153 grams of a solution of 20 percent by weight diethylaluminum ethoxide (DEALE) in isopentane is added. The tank is reheated to 45° C. and the mixture is agitated for 2 hours. The pressure is then reduced to 1,050 millimeters of mercury in 50 millimeter of mercury increments every 15 minutes. The temperature then rises to 70° C. and a 400 cubic centimeter per minute nitrogen purge is started to dry the mixture. The temperature is maintained at 70° C. and the pressure at 1,080 millimeters of mercury. The drying is continued for about 10 hours.

Approximately 800 grams of catalyst, i.e., the reaction product of triphenylsilyl chromate and diethylaluminum ethoxide having an aluminum/chromium atomic ratio of 6:1, are recovered.

Trimerization of Ethylene to 1-Hexene and Copolymerization of Ethylene and 1-Hexene The trimerization and copolymerization are carried out in a fluidized bed reactor as in Example 1.

The catalyst is introduced into the reactor in a weight ratio of catalyst to polyethylene produced of 0.00051:1.

The feed rate of 1-hexene is 0.7 pound per hour and the partial pressure of 1-hexene is initially 1.77 psi. The polymer density is 0.949 gram per cubic centimeter.

It is found that there is no trimerization of ethylene to 1-hexene using the catalyst prepared with diethylaluminum ethoxide at an aluminum/chromium atomic ratio of 6:1.

The catalyst formulation, polymerization conditions, and resin properties for Example 5 are set forth in the Table.

TABLE

| | Example | | | | |
|---|---|---|---|---|---|
| | 1 | 2 | 3 | 4 | 5 |
| CATALYST | | | | | |
| Al Source | TIBA | TIBA | TIBA | TIBA | DEAEO |
| Al/Cr Mole Ratio | 6 | 6 | 10 | 10 | 6 |
| REACTION CONDITIONS | | | | | |
| Temperature (°C.) | 94 | 94 | 88.1 | 87.5 | 91.1 |
| Pressure (psia) | 315 | 315 | 315 | 315 | 315 |
| $C_2$ Partial Pressure, psia | 230 | 215 | 234 | 235 | 236 |
| $C_2H_4$ Mole Percent | 73.0 | 68.3 | 74.3 | 74.6 | 74.9 |
| $H_2/C_2$ Molar Ratio | 0 | 0.0991 | 0.0995 | 0.1000 | 0.0016 |
| $C_4/C_2$ Molar Ratio | 0 | 0 | 0.007 | 0.0031 | 0.0004 |
| $C_6/C_2$ Molar Ratio | 0.004 | 0.0039 | 0.009 | 0.0047 | 0.0075 |
| Oxygen Add-Back, parts per billion | 300 | 330 | 190 | 120 | 0 |
| Production Rate, pounds per hour | 41 | 38 | 37 | 39 | 37 |
| Fluidized Bulk Density, pounds per cubic foot | 18.6 | 18.2 | 16.9 | 17.3 | 19.4 |
| Bed Weight, pounds | 200 | 200 | 200 | 200 | 200 |
| Residence Time, hours | 4.88 | 5.31 | 5.36 | 5.17 | 5.45 |
| STY, pounds per hour per cubic foot | 3.82 | 3.43 | 3.16 | 3.34 | 3.56 |
| RESIN PROPERTIES | | | | | |
| Flow Index, decigrams per minute | 4.5 | 9.6 | 12.5 | 7.5 | 8.4 |
| Melt Index, decigrams per minute | 0.258 | 0.356 | 0.459 | 0.265 | 0.336 |
| MFR | 17.5 | 26.9 | 27.2 | 28.3 | 25.0 |
| Density, gram per cubic centimeter | 0.947 | 0.949 | 0.944 | 0.956 | 0.949 |
| Ash, weight percent | 0.019 | 0.020 | — | 0.061 | 0.051 |
| Catalyst Productivity | 5263 | 5000 | — | 1639 | 1961 |
| Bulk Density, pound per cubic foot | 26.3 | 26.0 | 25.3 | 26.3 | 34.3 |

TABLE-continued

|  | Example | | | | |
|---|---|---|---|---|---|
|  | 1 | 2 | 3 | 4 | 5 |
| APS, inches | 0.0187 | 0.0172 | 0.0156 | — | 0.0202 |

Notes to Table:
1. The difference between reactor pressure and partial pressure is made up with nitrogen.
2. The 1-hexene/ethylene molar ratio is measured in the cycle gas. It is noted, in examples 3 and 4, that there is considerable 1-hexene in the cycle gas after the 1-hexene feed is discontinued.
3. Oxygen Add-Back is given in parts by volume per billion parts of ethylene feed to the reactor. Oxygen Add-Back is explained as follows: A dilute system of oxygen in nitrogen, typically 100 ppmv is added to the reactor in a controlled flow relative to the feed rate of ethylene monomer to the reactor to achieve the desired oxygen add-back level in ppbv.
4. Production rate is the pounds per hour of ethylene/1-hexene copolymer produced.
5. Fluidized Bulk Density is the pounds per cubic foot of fluidized bed in the fluidized state.
6. Bed Weight is the weight of the fluidized bed in pounds.
7. STY stand for space/time/yield given in pounds per hour per cubic foot.
8. Flow Index is determined under ASTM D-1238, Condition F. It is measured at 10 times the weight used in the melt index test and reported in decigrams per minute.
9. Melt Index is determined under ASTM D-1238, Condition E. It is measured at 190° C. and reported in decigrams per minute.
10. Melt Flow Ratio (MRF) is the ratio of flow index to melt index.
11. Density is the density of the ethylene/1-hexene copolymer in gram per cubic centimeter.
12. Ash is given in weight percent and is determined under ASTM D-229.49.
13. Catalyst Productivity is the pounds of ethylene/1-hexene copolymer produced per pound of catalyst.
14. Bulk Density is the pounds of ethylene/1-hexene copolymer per cubic foot.
15. APS is the average particle size of the particular resin produced. It is based on a measure of the average diameter of the particles in inches.

Notes to Table:
1. The difference between reactor pressure and partial pressure is made up with nitrogen.
2. The 1-hexene/ethylene molar ratio is measured in the cycle gas. It is noted, in examples 3 and 4, that there is considerable 1-hexene in the cycle gas after the 1-hexene feed is discontinued.
3. Oxygen Add-Back is given in parts by volume per billion parts of ethylene feed to the reactor. Oxygen Add-Back is explained as follows: A dilute stream of oxygen in nitrogen, typically 100 ppmv is added to the reactor in a controlled flow relative to the feed rate of ethylene monomer to the reactor to achieve the desired oxygen add-back level in ppbv.
4. Production rate is the pounds per hour of ethylene/1-hexene copolymer produced.
5. Fluidized Bulk Density is the pounds per cubic foot of fluidized bed in the fluidized state.
6. Bed Weight is the weight of the fluidized bed in pounds.
7. STY stand for space/time/yield given in pounds per hour per cubic foot.
8. Flow Index is determined under ASTM D-1238, Condition F. It is measured at 10 times the weight used in the melt index test and reported in decigrams per minute.
9. Melt Index is determined under ASTM D-1238, Condition E. It is measured at 190° C. and reported in decigrams per minute.
10. Melt Flow Ratio (MFR) is the ratio of flow index to melt index.
11. Density is the density of the ethylene/1-hexene copolymer in gram per cubic centimeter.
12. Ash is given in weight percent and is determined under ASTM D-229.49.
13. Catalyst Productivity is the pounds of ethylene/1-hexene copolymer produced per pound of catalyst.
14. Bulk Density is the pounds of ethylene/1-hexene copolymer per cubic foot.
15. APS is the average particle size of the particular resin produced. It is based on a measure of the average diameter of the particles in inches.

We claim:

1. A process for the production of a copolymer of ethylene and 1-hexene which comprises simultaneously:
   a) trimerizing ethylene to form 1-hexene,
   b) removing a portion of the 1-hexene in order to control the density of the copolymer product, and
   c) polymerizing ethylene and 1-hexene formed by said trimerizing, optionally in the presence of hydrogen, in a reaction zone in the presence of a catalyst comprises of the support reaction product of one or more bis-triarylsilyl chromate compounds and one or more trihydrocarbylaluminum compounds in a ratio such that the atomic ratio of aluminum to chromium in the final reaction product is at least about 3 to 1.

2. A process for the simultaneous trimerization of ethylene and the copolymerization of the trimer with ethylene comprising continuously contacting ethylene, the 1-hexene which is formed, and hydrogen in a reaction zone, under trimerization and polymerization conditions, with the silica supported reaction product of a bis-triarylsilyl chromate and a trihydrocarbylaluminum compound, and removing a portion of the 1-hexene in order to control the density of the copolymer product wherein
   (i) the atomic ratio of aluminum to chromium is in the range of about 6:1 to about 15:1; and
   (ii) the molar ratio of hydrogen to ethylene is in the range of up to about 0.3:1.

3. A process for the production of a copolymer of ethylene and 1-hexene which comprises simultaneously:
   a) trimerizing ethylene to form 1-hexene, and
   b) polymerizing ethylene and 1-hexene formed by said trimerizing, optionally in the presence of hydrogen, in a fluidized bed reaction zone in the presence of a catalyst comprised of the supported reaction product of one or more bis-triarylsilyl chromate compounds and one or more trihydrocarbylaluminum compounds in a ratio such that the atomic ratio of aluminum to chromium in the final reaction product is in the range of about 6:1 to about 10:1.

4. The process defined in claim 3 wherein hydrogen is present.

5. The process defined in claim 4 wherein the hydrogen is present in a molar ratio of hydrogen to ethylene in a range of up to about 0.3:1.

6. The process defined in claim 3 wherein the support is silica.

7. The process defined in claim 3 wherein the chromate is bis-triphenylsilyl chromate.

8. The process defined in claim 3 wherein the trihydrocarbylaluminum is triisobutylaluminum.

9. The process defined in claim 3 wherein additional 1-hexene is added in order to control the density of the copolymer product.

10. A process for the simultaneous trimerization of ethylene and the copolymerization of the trimer with ethylene comprising continuously contacting ethylene, the 1-hexene which is formed, and, optionally, hydrogen in a fluidized bed reaction zone, under trimerization and polymerization conditions, with the supported reaction product of one or more bis-triarylsilyl chromates and one or more trihydrocarbylaluminum compounds wherein the atomic ratio of aluminum to chromium is in the range of about 6:1 to about 10:1.

11. A process for the simultaneous trimerization of ethylene and the copolymerization of the trimer with ethylene comprising continuously contacting ethylene, the 1-hexene which is formed, and hydrogen in a fluidized bed reaction zone, under trimerization and polymerization conditions, with the silica supported reaction product of a bis-triarylsilyl chromate and a trihydrocarbylaluminum compound wherein
  (i) the atomic ratio of aluminum to chromium is in the range of about 6:1 to about 10:1; and
  (ii) the molar ratio of hydrogen to ethylene is in the range of up to about 0.3:1.

12. The process defined in claim 11 wherein the chromate is bis-triphenylsilyl chromate.

13. The process defined in claim 11 wherein the trihydrocarbylaluminum is triisobutylaluminum.

14. The process defined in claim 11 wherein additional 1-hexene is added in order to control the density of the copolymer product.

* * * * *